United States Patent
Gundlach (10) Patent No.: US 9,757,921 B2
(45) Date of Patent: Sep. 12, 2017

(54) PACKAGING MATERIAL FORMULATIONS AND PACKAGES CONSTRUCTED THEREFROM

(71) Applicant: Kurt B. Gundlach, Warren, MA (US)

(72) Inventor: Kurt B. Gundlach, Warren, MA (US)

(73) Assignee: AR Metallizing Ltd., Franklin, MA (US)

( * ) Notice: Subject to any disclaimer, the term of this patent is extended or adjusted under 35 U.S.C. 154(b) by 697 days.

(21) Appl. No.: 13/962,621

(22) Filed: Aug. 8, 2013

(65) Prior Publication Data

US 2014/0044903 A1 Feb. 13, 2014

Related U.S. Application Data

(60) Provisional application No. 61/680,790, filed on Aug. 8, 2012.

(51) Int. Cl.
| | |
|---|---|
| *B32B 7/02* | (2006.01) |
| *B32B 15/08* | (2006.01) |
| *B32B 1/02* | (2006.01) |
| *B32B 23/06* | (2006.01) |
| *C09D 133/06* | (2006.01) |

(52) U.S. Cl.
CPC ............ *B32B 7/02* (2013.01); *B32B 1/02* (2013.01); *B32B 15/08* (2013.01); *B32B 23/06* (2013.01); *B32B 2307/718* (2013.01); *B32B 2439/70* (2013.01); *C09D 133/06* (2013.01); *Y10T 428/1334* (2015.01); *Y10T 428/24942* (2015.01)

(58) Field of Classification Search
CPC ..... B32B 15/08; B32B 1/02; B32B 2307/718; B32B 23/06; B32B 2439/70; B32B 7/02; C09D 133/06; Y10T 428/1334; Y10T 428/24942
USPC ................................................. 428/35.7, 212
See application file for complete search history.

(56) References Cited

U.S. PATENT DOCUMENTS

| | | | | |
|---|---|---|---|---|
| 5,470,594 A | * | 11/1995 | Di Mino | B32B 29/00 206/524.3 |
| 6,193,831 B1 | * | 2/2001 | Overcash | D21H 19/16 156/230 |
| 6,740,373 B1 | * | 5/2004 | Swoboda | B32B 29/06 229/5.81 |
| 2010/0040888 A1 | * | 2/2010 | Fields | C08J 7/045 428/418 |

* cited by examiner

*Primary Examiner* — Yan Lan
(74) *Attorney, Agent, or Firm* — The Watson I.P. Group, PLC; Jovan N. Jovanovic; Vladan M. Vasiljevic (57) ABSTRACT

A film for packaging useable with foodstuffs comprising a paperboard or biopolymer base material, a base coat structure, a metallized layer, and a top coat structure. The base coat structure has one or more layers, each having a weight less than or equal to 1% of the base material and of differing chemical composition and the sum is less than or equal to 5% of the structure weight. The metallized layer is on the base coat structure to an optical density of between 2.0 and 4.5. The top coat structure has an outer and an inner layer, with each layer less than or equal to 1% of the weight of the base material and of differing chemical composition. A bag made from such a film is likewise disclosed, as is a film without a metallized layer.

18 Claims, 5 Drawing Sheets

PACKAGING MATERIAL FORMULATIONS AND PACKAGES CONSTRUCTED THEREFROM

CROSS-REFERENCE TO RELATED APPLICATION

This application claims priority from U.S. Provisional patent application Ser. No. 61/680,790 filed Aug. 8, 2012, entitled "Packaging Material Formulations and Packages Constructed Therefrom," the entire specification of which is hereby incorporated by reference.

BACKGROUND OF THE DISCLOSURE

1. Field of the Disclosure

The disclosure relates in general to packaging material formulations, and more particularly, to a plurality of film structures for packaging, which film structures can be formed into bags, sacks, containers, wraps and the like for packaging food and other goods. While not limited thereto, the film structures are well suited for use in association with hot food items, such as hot sandwiches and the like.

2. Background Art

The Packaging material formulations for different products is well known in the art. Often, and especially for hot food items (such as sandwiches and the like), which US FDA requires maintenance of food temperature above 140 F prior to serving, a common formulation of a packaging material comprises a paper outer substrate having an inner foil liner. The foil may be utilized for direct food contact, or, a layer (resin, wax or the like) may be applied over the foil.

Problematically, such a construction is not well suited for recycling or for composting. Specifically, while the paper outer substrate may be suitably degrade, the inner foil liner is unsuitable for composting or paper recycling. Thus, other, more expensive and often economically unfeasible methods would be required to recycle the packaging. Additionally, where such packaging is improperly discarded, the product will not generally disintegrate, and will remain an eyesore for years. Finally, such a product is often relegated to a garbage dump wherein it is buried underground for decades.

It would be advantageous to devise and utilize packaging material which has performance characteristics that are suitable for use in association with food items, including hot food items, such as sandwiches, while also having characteristics that are well suited for paper recycling and commercial or industrial composting, while maintaining the superior radiant barrier property of aluminum foil. Radiant barrier is quantitatively measured with an Emissometer, for which the silver standard is 0.05 units and the black standard is 0.87 units. Both aluminum foil and vacuum metallized aluminum products exhibit good radiant barrier with an emissivity range of 0.05 units to 0.15 units, compared to white papers, which exhibit an emissivity of approximately 0.75 units to 0.85 units.

SUMMARY OF THE DISCLOSURE

The disclosure is directed a film for use in association with packaging useable with foodstuffs having product contact. The film comprises a base material, a base coat structure, a metallized layer, and a top coat structure. The base material comprises a dimensionally stable cellulosic (preferably paperboard) material having a top surface and a bottom surface. Further, the base material has a base material weight per unit area.

The base coat structure includes at least one base layer extending over substantially the entirety of the top surface of the base material. Each of the at least one base layers comprising a base layer weight per unit area. The at least one base layer weight per unit area of each of the at least one base layer is less than or equal to 1% of the base material weight per unit area. Additionally, the at least one base layer comprising a polymer coating. The metallized layer is applied directly to the outer base layer in an optical density of between 1.5 and 4.5 optical density. The top coat structure has an inner top layer applied directly to the metallized layer and an outer top layer applied over the inner top layer. The inner top layer and the outer top layer comprise polymer coatings which are chemically distinct from each other and from each of the at least one base layer of the base coat. Chemically distinct is defined as being unique in the polymers monomers composition and or molecular weight for dissolved solid resins as well as in the case of aqueous polymer emulsions and dispersions, solution stabilizing agents and or film forming coalescing and plasticizing agent's incorporation.

The inner top layer has an inner top layer weight per unit area which is less than or equal to 1% of the base material weight per unit area. The inner top layer has a glass transition temperature that is less than 100° C. and a weight that is greater or equal to 25,000 grams per mole (MW). Molecular weight (MW) is defined for solid acrylic bead resin polymers as referring to the average molecular weight obtained with normal modal molecular weight distribution resulting from the polymerization process of reactive monomers in solution, prior to subsequent processing into solid grade products.

The outer top layer has a glass transition temperature (often referred to herein as Tg or polymer softening temperature) that is greater than 100° C.

In a preferred embodiment, the at least one base layer comprises an inner base layer applied over the base material and an outer base layer applied over the inner base layer. The inner base layer has an inner base layer weight per unit area. The at least one inner base layer weight per unit area is less than 1% of the base material weight per unit area. The outer base layer has an outer base layer weight per unit area which is less than 1% of the base material weight per unit area.

In another preferred embodiment, the outer base layer is applied directly over the inner base layer, and extends over substantially the entirety of the inner base layer.

In another preferred embodiment, the top coat structure further includes at least one intermediate top layer positioned between the inner top layer and the outer top layer. Each of the at least one intermediate top layers having an intermediate top layer weight per unit area that is less than or equal to 1% of the base material weight per unit area.

In another preferred embodiment, a sum of each one of the at least one base layer weight per unit area, the inner top layer weight per unit area, the outer top layer weight per unit area, and each of the at least one intermediate top layer weight per unit area is less than or equal to 5% of the base material weight per unit area.

In a preferred embodiment, the inner base layer further comprises a combination of a modified acrylic copolymer and a modified styrene acrylic copolymer coating. In certain such embodiments, the outer base layer further comprises a BMA acrylic copolymer coating having a high molecular weight. Further, it is contemplated that in some such embodiments, the top coat structure further comprises two layers, an inner top layer and an outer top layer. The inner top layer comprising a high acid acrylic polymer coating.

The outer top layer comprising an acrylic MMA copolymer coating. Preferably, the base material weight per unit area comprises between 35 pounds per ream and 50 pounds per ream.

In another embodiment, the inner base layer further comprises a BMA acrylic copolymer coating. In some such embodiments, the outer base layer further comprises a high acid acrylic polymer coating having a high molecular weight. In certain such embodiments, the top coat structure further comprises two layers, an inner top layer and an outer top layer. The inner top layer comprises a BMA acrylic copolymer coating having a high molecular weight and the outer top layer comprises a MMA acrylic copolymer coating.

In a preferred embodiment, the base material weight per unit area comprises between 35 pounds per ream and 50 pounds per ream.

In another preferred embodiment, the inner base layer comprises one of an acrylic BMA copolymer coating, and a combined modified acrylic copolymer and modified styrene acrylic copolymer coating.

Preferably, the outer base layer comprises at least one of a BMA acrylic copolymer coating, and a high acid acrylic copolymer coating, each having a high molecular weight.

In another preferred embodiment, the top coat structure further comprises two layers, an inner top layer and an outer top layer. The inner top layer comprises one of a styrene acrylic polymer coating, a BMA acrylic copolymer coating, an acrylic emulsion polymer coating, a high acid acrylic copolymer coating, and a water-based acrylic emulsion coating. The outer top layer comprises a BMA acrylic copolymer coating, an acrylic emulsion polymer coating and an acrylic MMA copolymer coating.

In one aspect of the disclosure, the disclosure is directed to a gusseted open top bag formed from any one of the film structures disclosed.

In another aspect of the disclosure, the disclosure is directed to a film for use in association with packaging useable with foodstuffs having product contact. In such an aspect of the disclosure, the metallized layer can be omitted, as can the top coats. An inner and outer base coat layer is provided which has the formulations that are set forth for the inner and outer top coats.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
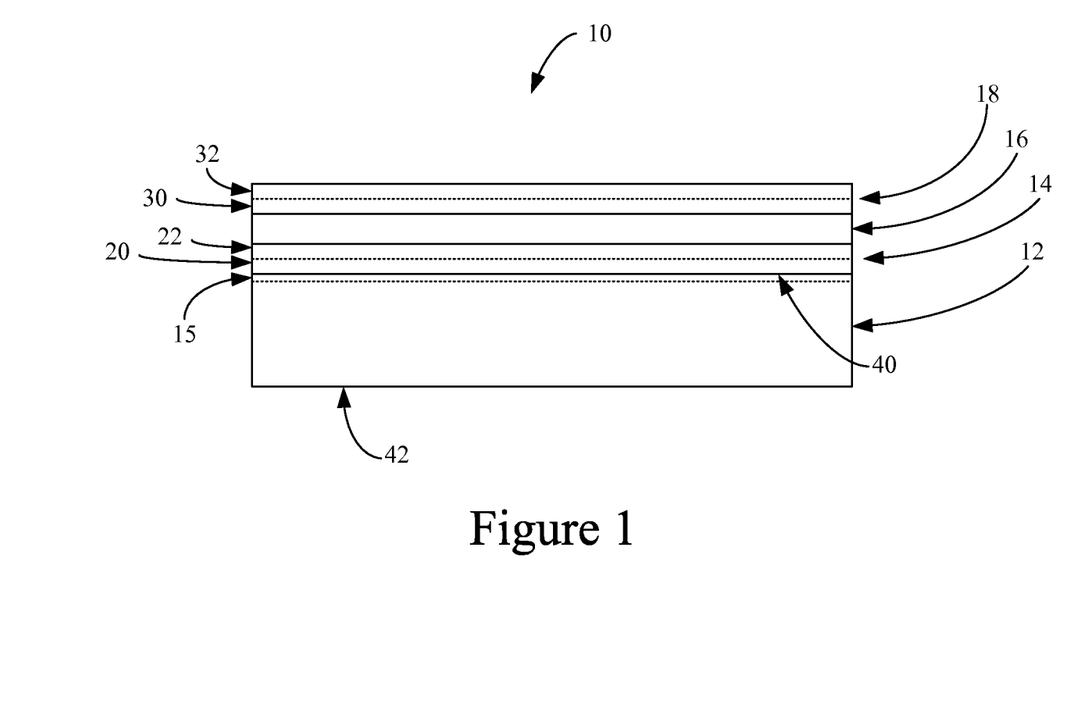
FIG. 1 of the drawings is a cross-sectional view of a film structure of the present disclosure.

Referring now to the drawings and in particular to FIG. 1, the compostable film for packaging and containers is shown generally at 10. The film structure is well suited for packages and bags of various types, and also as closures for other containers. While not limited thereto, the film is well suited for use in association with bags that are utilized in the food industry for, for example, packaging of foodstuffs including sandwiches or other prepared food that can be hot or cold. One such example is with the bags that can be utilized for holding hot sandwiches.

Figure 2:
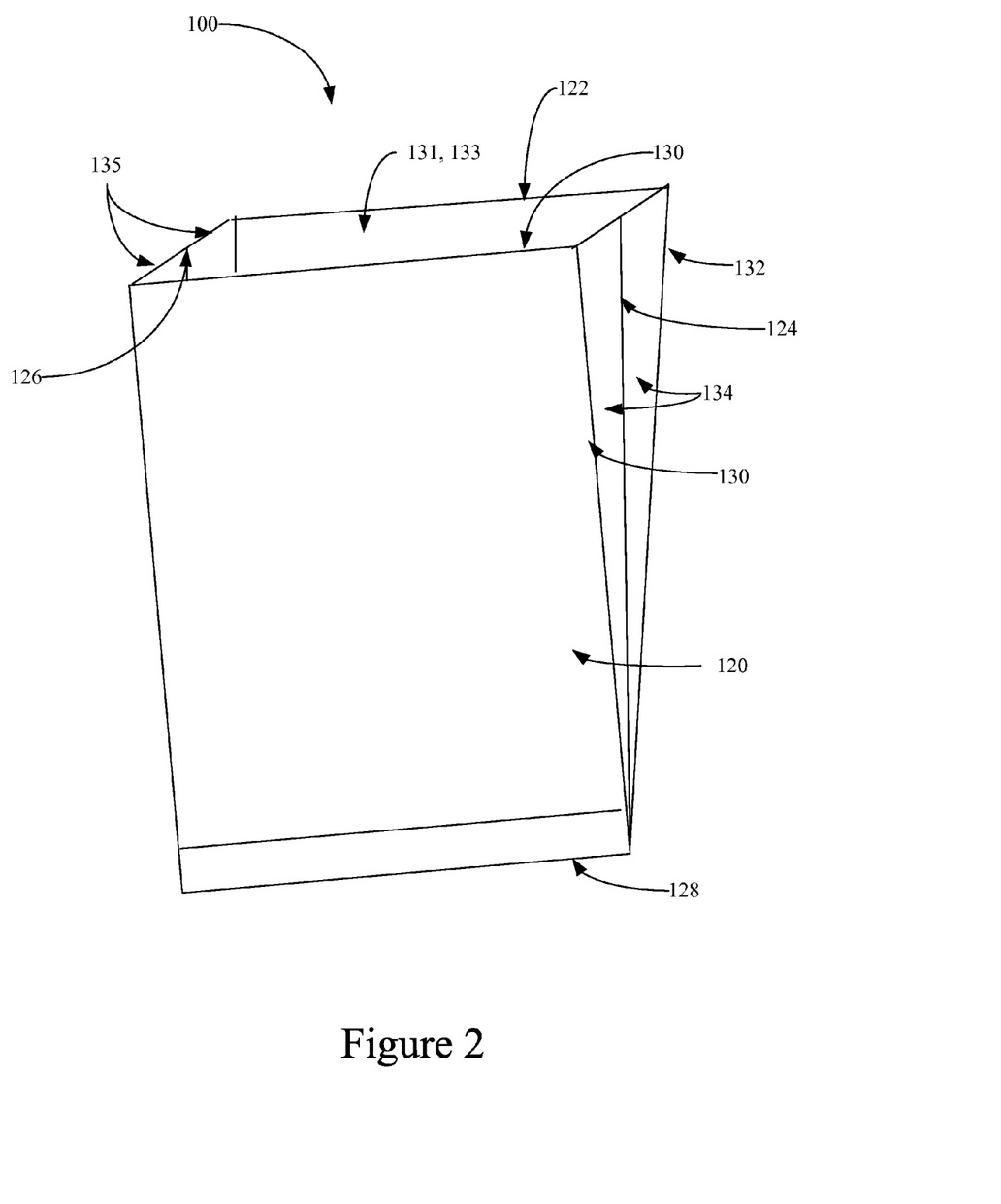
FIG. 2 of the drawings is a perspective view of an exemplary side gusset adhesive sealed pinch bottom bag of the type with which the film structures of the present disclosure may be utilized.

One example of such a bag 100 is shown in FIG. 2 as comprising a plurality of panels that together form a bag with a single opening. In the example shown, the bag 100 includes front panel 120, back panel 122, and first and second gusseted sides 134, 135. The front and back panels are substantially uniformly rectangular, although the same is not required. The first gusset spans between the front panel and the back panel on one side, with the second gusset spanning between the front panel and the back panel on the other side. In the embodiment shown, the first gusset joins the front panel at the front fold 130, and the back panel at back fold 132. The gusseted fold 124 is positioned therebetween so that the panel gussets inwardly when folded. The second gusset is substantially a mirror image of the first gusset.

The front panel and the back panel, with the first gusset and second gusset (both in a folded orientation) are joined together at the adhesive sealed folded pinch bottom edge 128. In certain embodiments, the gussets may be excluded from the sealed bottom edge, however, the sealing of all of the components enhances the retention of heat. The bag 100 is open at the opposing end, namely at top edge 130, which defines opening 131, which, in turn, provides ingress into cavity 133.

Of course, other bags constructions are likewise contemplated for use, including, but not limited to pillow type bags. Packages that are tubular, in that they are open at either end thereof, and can be folded over at either end. In other embodiments, a sheet like material can be utilized as a wrap, as such, the sandwich or other product can be placed on the sheet and the sheet can be rolled around the sandwich, with both of the ends being folded over for purposes of closure. Again, a number of different types of bags and containers are likewise contemplated for use.

The film 10 for use in association with the foregoing bags and containers is shown schematically in FIG. 1 as comprising base material 12, base coat structure 14, metallized layer 16, and top coat structure 18. It will be understood that many of these structures comprise a plurality of layers and a plurality of different materials. In other embodiments, the structures may comprise a single layer. It is contemplated that the base coat structure and the top coat structure materials meet the specification of FDA, enumerated in 21 C.F.R. §§176.170 and 176.180 while providing adequate performance in the intended use. One such intended use is in association with hot sandwiches. It is also contemplated that the film 10 is substantially uniform in cross-sectional configuration, in that the layers are substantially coextensive with each other.

The base material 12 comprises a generally dimensionally stable biodegradable substantially uniformly planar material (having a generally uniform thickness) such as a cellulosic material, such as, for example, a cellulose based paperboard material and includes top surface 40 and bottom surface 42. Generally substantially flat paperboard sheets are contemplated, however, it is also contemplated that molded paperboard materials may be utilized. The contemplated paper weights may be between 30 and 70 pounds per ream, which corresponds to metric values of 49.2 and 114.8 grams per square meter (gsm) respectively, however other papers of different (i.e., greater or lesser) weight are likewise contemplated. One particularly useful material comprises a fifty pound paperboard material which provides a measure of strength and structure to bag 100. By fifty pound paperboard, it is meant that a ream of such paper (generally 500 sheets) in a predetermined size (generally a letter size) has a weight of 50 pounds, which is essentially a weight per 500 sheets, with each sheet having an area (with the SI equivalent measurement being grams per meter squared, or gsm). As such, such a weight system is essentially a weight per area. Other paperboard materials are likewise contemplated such as, for example, a thirty eight pound paper or a thirty five pound paper. Among other papers, one particular base material that was utilized comprises a thirty eight and/or fifty pound paper sold under the trade name Bladepak A SR2 and SR2 available from Twin Rivers Paper Company of South Portland, Me. Another paper is a thirty-five pound paper available under the trade name New Page Propoint Medalist available from NewPage Corporation of Miamisburg, Ohio. Yet another paper is a machine glazed, grease guard one side coated, Specialty Paper 079340 35# NATL MG GREASEGUARD KIT 7 1 SIDED available from Thilmany Papers of Ludlow, Mass. Such papers include either a clay coating, or after machine glazing, a grease resistant coating, 15 on at least one surface thereof. Such coatings aid to fill in pinholes or other voids in the paper itself, which, in turn, allows for improved application of the top coat thereto. Of course, other cellulose materials, or bio polymers are likewise contemplated for use.

The base coat structure 14 is shown in FIG. 2 as comprising a plurality of layers that are applied sequentially to the base material. In the embodiment shown, a pair of base coat layers are disclosed, an inner base layer 20 and an outer base layer 22. It will be understood that each of the separate layers comprise a different material, and preferably, are maintained at less than or equal to 1% of the weight of the substrate per unit weight (i.e., with fifty pound paper (i.e., fifty pounds per ream), each layer is less than or equal to a half pound per ream). It will be understood that additional layers may be applied between the inner base layer and the outer base layer in certain embodiments. Further, it is also contemplated that the base coat structure may comprise a single layer (in embodiments having a metallized layer). Generally, the base coat structure may be non-biodegradable. Additionally, each one of the layers of the base coat structure are chemically distinct. As set forth above, each of the layers of the base coat structure are chemically distinct. Chemically distinct is defined as being unique in the polymers monomers composition and or molecular weight for dissolved solid resins as well as in the case of aqueous polymer emulsions and dispersions, solution stabilizing agents and or film forming coalescing and plasticizing agent's incorporation. Where it is contemplated that the multiple layers have non-chemically distinct structures, the total weight of the layers having the same structure is less than or equal to 1%. The same is the case if the same chemical compositions are base coat structure and the top coat structure.

The inner base layer, it is contemplated, may the inner base layer comprises one of a BMA acrylic copolymer coating, and a combined modified acrylic copolymer with a modified styrene acrylic copolymer coating. For example, the inner base coating may comprise a PB-588 (a high acid acrylic copolymer resin, and a high molecular weight acrylic bead resin), MB-7017 (an acrylic BMA copolymer resin), MB-2588 (a BMA acrylic copolymer resin, and a high molecular weight acrylic bead resin), a combination of Joncryl DFC 3040 (a modified acrylic copolymer resin) and DFC 3050 (a modified styrene acrylic polymer resin) in the presence of Surfynol DF-75^Defoamer anti-foam agent (contains FDA approved ingredients and meets the requirements of the following sections of 21 CFR; 175.105, 175.300, 176.170, 176.180, 176.200 and 176.210 with restrictions to a maximum application rate of 16.2 mg of Surfynol DF-75 Defoamer per 1,000 square inches of coating). In the instance of MB-7017, the material is in a 20% by weight solution of ethyl acetate, for example. In the case of MB-2588, the material is in a 15% by weight solution of ethyl acetate. With the combination of the Joncryl formulations, the material is in a 9% by weight solution of each of DFC 3040 and DFC 3050 acrylic solids, with a minimum amount of foam control agent, below 0.25 formula weight percent (0.25 formula weight percent equals 7.6 mg of Surfynol DF-75 Defoamer per 1,000 square inches), to minimize foaming, for purposes of application.

The outer base layer 22, it is contemplated, may comprise at least one of a BMA copolymer coating, and a relatively high acid acrylic coating (acid value of approximately 50 milligrams potassium hydroxide per gram of polymer), with high molecular weights of approximately 90,000 grams per mole. For example, the same PB-588, or MB-7017 as disclosed above (i.e., 20% by weight solution of ethyl acetate) may be utilized for the outer base layer 22. In other embodiments, the MB-7017 may be in a 15% by weight solution of ethyl acetate. In yet other embodiments, MB-2588 is contemplated for use, in a preparation similar to that disclosed above. Of course, other materials are likewise contemplated, and the disclosure is not limited to the foregoing materials. It has been found that these combinations, however, do yield the proper desired final constructions.

It has been found that utilizing high molecular weight acrylic bead resins, such as MB-2588 (MW=90K) and PB-588 (MW=90K) for the outer base layer 22 represses the propensity for metal flaking upon sheet folding (gusset folds).

With respect to the inner base layer 21, and the outer base layer 22, placement of Dianal PB-588 as outer base layer 22 over Dianal MB-7017 as inner base layer 21 coating has adequate tape adhesion (pursuant to ASTM 610 tape adhesion test, coated plastic and coated paper industries standard). It has been found that the placement of Dianal PB-588 as outer base layer 22 over Dianal BR-57 as inner base layer 21 has inadequate 610 tape adhesion.

The metallized layer preferably comprises a metallized vapor deposited layer of aluminum or another metal directly onto the outer base layer 22. The metallized layer is generally applied to the underlying outer base layer, and lacks the structural integrity to stand on its own as a separately layer that is joined to the underlying outer base layer. The metallized layer can be applied through metallized vapor deposition to optical densities greater than approximately 1.5 and typically less than approximately 4.0. In some preferred embodiments, an optical density that is greater than or equal to 2.2, and more preferably greater than or equal to 2.7 is desired. It is also contemplated that in other embodiments the optical density of in excess of 3.2 and typically less than about 4.0 is desired for utilization. It will be understood that the optical density is proportional to the thickness, and inversely proportional to resistivity, and optical densities can be measured by measuring the resistance over a particular surface area.

Upon application of the metallized layer upon the plurality of layers of the base coat (and with the clay coated base material), the metallized layer has a gloss that resembles foil and the like. It has been found that the metallized layer, surprisingly, has a dramatically increased performance as compared to the use of foil. This is due to the decreased thermal conductivity of the ultra-thin (122 angstroms thickness corresponds to an OD=2.0 and 500 angstroms thickness which corresponds to an OD=4.0) metallized layer, relative to the thinnest foil leaf commercially available (0.2 millimeters=2,000,000 angstroms), thereby limiting the condensation of steam onto the film. At the same time, the metallized layer provides radiant barrier properties substantially equal to the foil.

In other embodiments, wherein the bag 100 may be utilized for a hot product (such as sandwiches and the like) that is generally considered as having a shelf life of 90 minutes (catering box must keep hot food above 140F for FDA food catering requirements), the need for increased moisture vapor transmission is more limited. As a result, for such applications, while an optical density of 3.0-3.4 (resistivity of approximately 1.0 ohms/square meter, which corresponds to an OD of 3.2 and an aluminum thickness of 292 angstroms up to 1.1 ohms/square meter, which corresponds to an OD of 3.1 and an aluminum thickness of 270 angstroms) has been contemplated, adequate performance has been seen with optical densities in the range of 2.5-2.9 (resistivity of approximately 1.4 ohms/square meter, aluminum thickness range of 173 angstroms-236 angstroms). With the lower resistivity of 1.0-1.1 ohms/square meter, testing has revealed that a moisture vapor barrier of 3+/−2 grams water/square meter/24 hours was observed on a Mocon Permatran-W Model 3/61 unit set to 25° C. at a relative humidity of 98%. With the higher resistivity, of 1.4 ohms/square meter, testing has revealed that a moisture vapor barrier of 9+/−2 grams water/square meter/24 hours was observed on the same equipment at the same temperature and humidity setting. With use and discarding of the packaging within generally less than 90 minutes, it is often the case that the package is discarded prior to moisture vapor transmission being a cause of degradation and/or failure of the packaging.

The top coat structure 18 is shown in FIG. 2 as comprising an inner top coat layer 30 and an outer top coat layer 32. Generally, the outer top coat structure is the outermost layer and the food contact layer (or contents contact layer, where contents other than food are stored). As with the base coat structure, none of the layers of the top coat structure amount to more than 1 percent of the overall weight of the base material on a per unit basis. It is contemplated that in other embodiments, only a single layer may be utilized, or in excess of two layers may be utilized. It is desired that the inner top coat comprises a coating that is flexible, that is, a coating as described above that has a Tg that is less than 100° C. and that has a molecular weight of 25,000 g/mole (MW). Such a configuration, it has been found, facilitates the proper coating over the paperboard or over the metallized layer which then preserves the integrity of the metallized layer, precluding flaking and the like. As with the base coat structure, the different layers of the top coat are distinct relative to each other and relative to the different base coat structures.

For single layers, it is contemplated, without limitation, but by way of example, that MB-7017 can be utilized (prepared as 20% by weight in ethyl acetate), or BR-57 (prepared as 15% by weight in ethyl acetate). Where two layers are utilized, the BR-57 can comprise the inner top coat layer 30, as well as Cork PC-94 FDA (which is at 18% aqueous solids, OK for cold/ambient temperature food applications though with hot sandwiches the PC-94 FDA turns opaque white, due to re-emulsification, which blocks metal reflectivity). The outer top coat layer comprises the product contact layer, and such a layer comprises a polymer with a Tg which is greater than 100° C. so as to provide food release from the surface thereof (without food sticking, such as the bun of a sandwich). For example, The outer top coat layer 32 may comprise MB-2588 (prepared as 15% by weight in ethyl acetate), as well as Cork Kote-74-120 (which is at 18% aqueous solids, OK for cold/ambient temperature food applications though with hot sandwiches the PC-94 FDA turns opaque white, due to re-emulsification, which blocks metal reflectivity).

In another embodiment, inner top coat layer 30 comprises an application of Michem Coat 82 water-based acrylic emulsion. It has been found that such an inner top coat layer provides a soft, flexible, crack resistant coating which reduces propensity for gusset fold liquid leaching (pickle juice and peanut oil) along the edge folds and gussets 130, 132, 124 and 128 of the bag 100. It has also been found that the dried coating resists steam re-emulsification clouding and fish-eye repellency visualization as tested by exposure to steam over boiling water in a beaker for 30 minutes. The re-emulsification clouding of other aqueous emulsion coatings is accentuated by the loss of reflectivity of the deposited metal below the coating.

It will be understood that the product contact layer comprises, in the case of MB-7017, a n-BMA acrylic copolymer, with a MW of 42K; in the case of BR-57, a styrene acrylic copolymer, with a MW of 40K, in the case of MB-2588, a MMA/n-BMA acrylic copolymer, with an MW of 90K. In the cases of Cork Kote-74-120 and Cork PC-94 FDA, the material are proprietary acrylic emulsion polymer.

As for the different resins noted above, MB-7017, MB-2588, BR-57, BR-87 and PB-588 resins are all available from Dianal America, Inc. of Pasadena, Tex. The Joncryl DFC3040 and Joncryl DFC3050 resins are available from BASF of Florham Park, N.J. Surfynol DF-75 Defoamer is available from Air Products and Chemicals, Inc. of Allentown, Pa. The Cork resins are available from Cork Industries, Inc. of Folcroft, Pa. Michelman Coat 82 is available from Michelman Incorporated, Cincinnati Ohio. The properties of each of these resins is hereby incorporated by reference. All of the products described in this application meet US FDA 21 CFR 176.170 and 176.180 requirements for direct food contact compliance.

Figure 3:
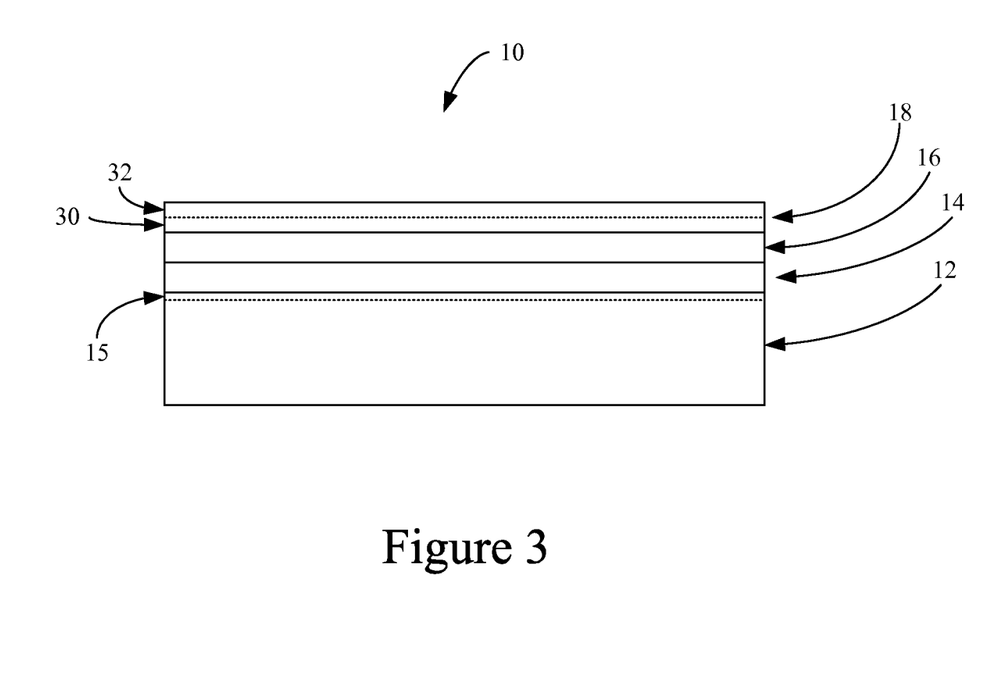
FIG. 3 of the drawings is a cross-sectional view of a film structure of the present disclosure.
Figure 4:
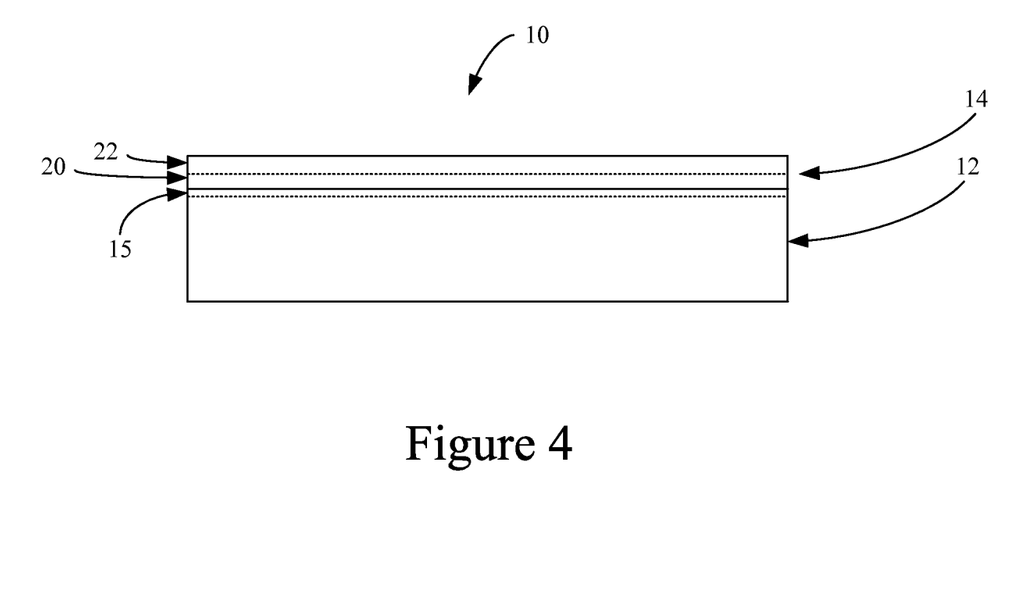
FIG. 4 of the drawings is a cross-sectional view of a film structure of the present disclosure showing a structure that does not include a metallized layer.
Figure 5:
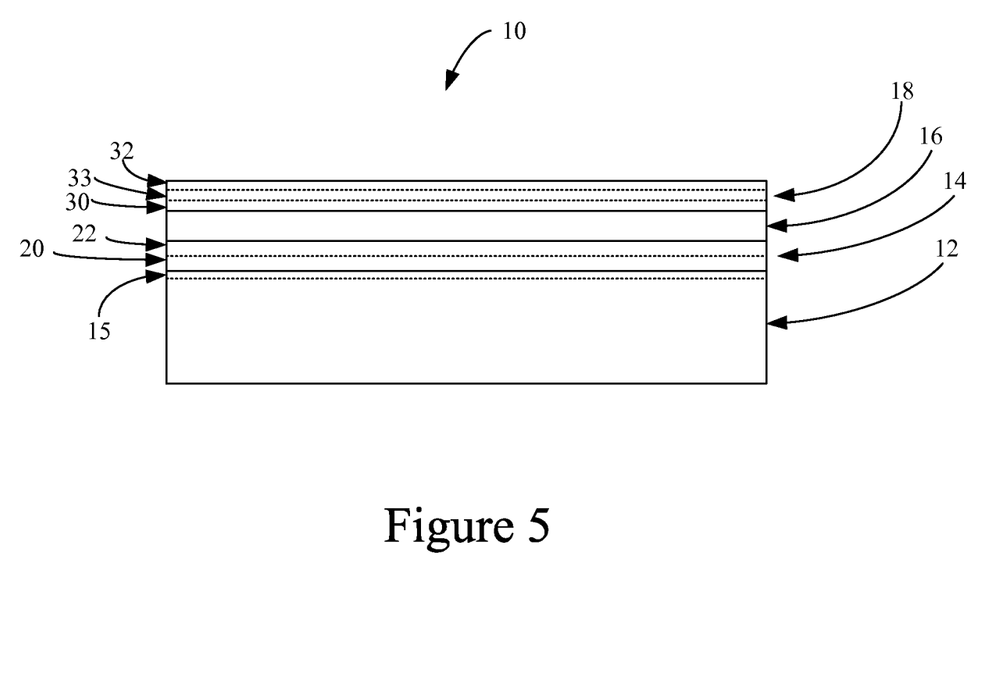
FIG. 5 of the drawings is a cross-sectional view of a film structure of the present disclosure having an intermediate top coat layer.

Certain variations to the structure of FIG. 2 are contemplated, and are shown in FIGS. 3, 4 and 5. In FIG. 3, the base coat structure upon which the metallized layer is applied may comprise a single layer, utilizing the formulations above with respect to either one of the base coat structures. In FIG. 4, the metallized layer can be omitted, with the resulting composition having an inner base coat and an outer base coat. The inner and outer base coats comprising the formulations disclosed with respect to the inner and outer top coat of formulations that include a metallized layer. In still other embodiments, such as the embodiment of FIG. 5, a greater number of either base coat layers or top coat layers are contemplated. It is contemplated that the total number of layers comprise less than or equal to 5 percent of the weight per unit area of the weight per unit area of the base material. Thus, it is envisioned that a total of five layers may be presented, that is two base coat layers and three top coat layers, thereby including an intermediate top coat layer 33. Other combinations are contemplated with the weight constraint of 5% of the weight per unit area of the corresponding weight of the base material.

From these different resins and layer formulations, a number of test samples were created which provided a basis under which to undertake testing, among other tests, the leaching of pickle juice and peanut oil. The pickle juice test comprises the placement of pickle juice from a pipette into one of the folds of the gusset with observation at 20 minutes and 90 minutes. The peanut oil test comprises the placement of peanut oil from a pipette into another of the folds of the gusset with observation at 20 minutes and 90 minutes. The 20 minutes simulates a sandwich being heated under a heating lamp, whereas the 90 minutes simulates a catering delivery of the sandwich. In other examples, actual burgers that were commercially prepared by Burger King or Chick-fil-A were placed in bags formed from bags prepared in accordance with the description given below.

EXAMPLE 1

The example has as its base material, a 35 pound per ream (57 gsm) New Page Propoint Medalist paper having a clay coating on one side thereof. To this material, a coating of less than or equal to 0.35 pounds per ream (≤0.57 gsm) of MB-7017 was applied thereto through a solvent so as to make up the inner base coat layer 20. In particular a solution of 20% MB-7017 was provided. The coating was applied to the underlying base material, and the ethyl acetate solvent was evaporated.

Next, a coating of less than or equal to 0.35 pounds per ream (≤0.57 gsm) of MB-7017 was applied thereto through a solvent so as to make up the outer base coat layer 22. The coating (formed identically to the inner base coat layer 20) was applied to the inner base coat layer 20, and the ethyl acetate solvent was evaporated.

Subsequently, a layer of aluminum was vapor deposited onto the exposed outer base coat layer 22. In this example, the optical density of the aluminum is on the order of 3.2. Once the aluminum had been deposited, the top coat structure was then applied.

The top coat structure comprised less than or equal to 0.35 pounds per ream (≤0.57 gsm) of MB-7017 that was applied through a solvent to make up the top coat structure. In this embodiment, a single top coat layer was applied. The formulation that was applied was identical to the inner base coat layer 20, with the solvent being evaporated.

When this formulation was tested, through the pickle juice test, after 20 minutes a high moderate leaching of the pickle juice was observed. That is, pickle juice had leached through the different layers and began to saturate the base material. Similarly, after 20 minutes, high moderate leaching of peanut oil through the layers and onto the base material was observed.

EXAMPLE 2

This example has as its base material, a 50 pound per ream (82 gsm) Bladepak A SR2 paperboard material having a clay coating on one side thereof. To this material, a coating of less than or equal to a 0.5 pound per ream (≤0.82 gsm) of MB-2588 is applied thereto through a solvent so as to make up the inner base coat layer 20. In particular, a solution of 15% MB-2588 in ethyl acetate was provided. The coating was applied to the underlying base material, and the ethyl acetate solvent was evaporated.

Next, a coating of less than or equal to a half pound per ream of MB-7017 was applied thereto through a solvent so as to make up the outer base coat layer 22. In particular, a solution of 15% MB-7017 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 3.2. Once the aluminum had been deposited, the top coat structure was then applied. Specifically, a coating of less than or equal to a 0.5 pound per ream (≤0.82 gsm) of BR-57 was applied to the vapor deposited aluminum layer so as to form the outer top coat layer 30. In particular, a solution of 15% BR-57 in ethyl acetate was provided. The coating was applied, and then the solvent was evaporated. As a single layer comprises the top coat structure 18, there is only a single material that is utilized.

When this formulation was tested, through the pickle juice test, after 20 minutes a high moderate leaching of the pickle juice was observed. That is, pickle juice had leached through the different layers and began to saturate the base material. Similarly, after 20 minutes, high moderate leaching of peanut oil through the layers and onto the base material was observed.

EXAMPLE 3

This example has as its base material, a 50 pound per ream (82 gsm) Bladepak SR2 paperboard material having a clay coating on one side thereof. To this material, a coating of less than or equal to 0.5 pound per ream (≤0.82 gsm) of a combination of Joncryl DFC 3040, Joncryl DFC 3050 and DF-75 was applied thereto through an aqueous solution so as to make up the inner base coat layer 20. In particular, a solution of 9% by weight DFC 3040 acrylic solids, 9% by weight DFC 3050 acrylic solids and 0.08% by weight the Surfynol DF-75 Defoamer anti-foaming agent was prepared. The coating was applied to the underlying base material, and the water was evaporated.

Next, a coating of less than or equal to 0.5 pound per ream (≤0.82 gsm) of MB-7017 was applied thereto through a solvent so as to make up the outer base coat layer 22. In particular, a solution of 15% MB-7017 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 3.2 optical density. Once the aluminum has been deposited, the top coat structure was then applied. Specifically, a coating of less than or equal to 0.5 pound per ream (≤0.82 gsm) of BR-57 was applied to the vapor deposited aluminum layer so as to form the inner top coat layer 30. In particular, a solution of 15% BR-57 in ethyl acetate was provided. The coating was applied, and then the solvent was evaporated. Finally, a coating of less than or equal to 0.5 pound per ream (≤0.82 gsm) of MB-2588 was applied to the inner top coat layer 30 to form the outer top coat layer 32.

When this formulation was tested, through the pickle juice test, after 90 minutes a slight leaching of the pickle juice was observed. That is, a small amount of pickle juice had leached through the different layers and began to saturate the base material. Similarly, after 90 minutes, a slight light spotting of peanut oil through the layers and onto the base material was observed.

EXAMPLE 4

This example has as its base material, a 50 pound per ream (82 gsm) Bladepak SR2 paperboard material having a clay coating on one side thereof. To this material, a coating of less than or equal to 0.5 pound per ream (≤0.82 gsm) of a combination of Joncryl DFC 3040, Joncryl DFC 3050 and Surfynol DF-75 Defoamer, applied thereto through an aqueous solution so as to make up the inner base coat layer 20. In particular, a solution of 9% by weight DFC 3040 acrylic solids, 9% by weight DFC 3050 acrylic solids and 0.08% by weight of the Surfynol DF-75 Defoamer anti-foaming agent was prepared. The coating was applied to the underlying base material, and the water was evaporated.

Next, a coating of less than or equal to 0.5 pound per ream (≤0.82 gsm) of MB-2588 was applied thereto through a solvent so as to make up the outer base coat layer 22. In particular, a solution of 15% MB-2588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 3.2 optical density. Once the aluminum has been deposited, the top coat structure was then applied. Specifically, a coating of less than or equal to 0.5 pound per ream (≤0.82 gsm) of Cork PC-94 FDA was applied to the vapor deposited aluminum layer so as to form the inner top coat layer 30. In particular, an aqueous solution of 18% solids was provided of the Cork PC-94 FDA. The coating was applied, and then the water was evaporated. Finally, a coating of less than or equal to 0.5 pound per ream (≤0.82 gsm) of Cork Kote-74-120 was applied to the inner top coat layer 30 to form the outer top coat layer 32. An aqueous solution of 18% solids was provided of the Cork Kote-74-120.

When this formulation was tested, through the pickle juice test, after 90 minutes no leaching of the pickle juice was observed. Similarly, after 90 minutes, there was no leaching of peanut oil through the layers and onto the base material.

EXAMPLE 5

This example comprises the same formulation as is disclosed with respect to Example 4, however, the base material is changed to a 38 pound per ream (62 gsm) Bladepak SR2 paperboard material having a clay coating. Additionally, in such an example, the layers that are applied for each of the base coat structure 14 and the top coat structure 18 comprise less than or equal to 0.38 pounds per ream (≤0.62 gsm). Finally, in this example, as well as in Example 4, formulations were formed that omitted any aluminum or other metallized layer.

EXAMPLE 6

This example comprises the same formulation as is disclosed with respect to Example 4, however, the base material is changed to 35 pound per ream (57 gsm) Specialty Paper 079340 35# NATL MG GREASEGUARD KIT 7 1 SIDED paperboard material having a machine glazed surface with a grease resistant coating applied. Additionally, in such an example, the layers that are applied for each of the base coat structure 14 and the top coat structure 18 comprise less than or equal to 0.35 pounds per ream (≤0.57 gsm). Finally, in this example, as well as in Example 4, formulations were formed that omitted any aluminum or other metalized layer.

EXAMPLE 7

The present example has as its base material, a 50 pound per ream (82 gsm) Bladepak SR2 paperboard material having a clay coating on one side thereof. To this material, a coating of less than or equal to 0.5 pound per ream (≤0.82 gsm) of a combination of Joncryl DFC 3040, Joncryl DFC 3050 and Surfynol DF-75 Defoamer, was applied thereto through an aqueous solution so as to make up the inner base coat layer 20. In particular, a solution of 9% by weight DFC 3040 acrylic solids, of 9% by weight DFC 3050 acrylic solids and 0.08 formula weight percent Surfynol DF-75 Defoamer. The coating was applied to the underlying base material, and the water was evaporated. During the evaporation, the web exit temperature of 175° F. was achieved to aid in polymer coalescence.

Next, a coating of less than or equal to 0.5 pound per ream (≤0.82 gsm) of Dianal MB-2588 is applied thereto through a solvent so as to make up the outer base coat layer 22. In particular, a solution of 17.5 formula weight percent MB-2588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum is on the order of 2.7 optical density. Once the aluminum has been deposited, the inner and outer top coat structures were then applied. Specifically, a coating of less than or equal to 0.5 pound per ream of Dianal PB-588 (≤0.82 gsm) was applied to the vapor deposited aluminum layer so as to form the inner top coat layer 30. In particular, a solution of 16 formula weight percent PB-588 in ethyl acetate was provided. The coating was applied, and then the solvent was evaporated. Finally, a coating of less than or equal to 0.5 pound per ream of Dianal BR-87 (≤0.82 gsm) was applied to the inner top coat layer 32. In particular, a solution of 17.5 formula weight percent BR-87 in ethyl acetate was provided. The coating was applied, and then the solvent was evaporated.

This structure was then formed into a bag of the type shown in FIG. 1. For purposes of texting, hot chicken sandwiches having pickles and being cooked in peanut oil were placed into the bag 100. The bag was then placed into a large catering box with a hot lava pack insert. When this bag having the formulation set forth in this example was tested, pickle juice and peanut oil leaching repression, through both the panel side and gusset folds was noted. In addition, excellent hot sandwich bun release after a 90 minute catering run, was noted with no bun sticking on the product contact surface, namely, the inner top coat layer 32.

EXAMPLE 8

The present example has as its base material, a 38 pound per ream (62 gsm) Bladepak SR2 paperboard material having a clay coating on one side thereof. To this material, a coating of less than or equal to 0.4 pounds per ream (≤0.62 gsm) of a combination of Joncryl DFC 3040, Joncryl DFC 3050 and Surfynol DF-75 Defoamer, was applied thereto through an aqueous solution so as to make up the inner base coat layer 20. In particular, a solution of 9% by weight DFC 3040 acrylic solids mixed with 9% by weight DFC 3050 acrylic solids and 0.08 formula weight percent Surfynol DF-75 Defoamer. The coating was applied to the underlying base material, and the water was evaporated in a 70 C oven for 1 minute to both dry and aid in polymer coalescence.

Next, a coating of less than or equal to 0.4 pounds per ream (≤0.62 gsm) of Dianal MB-2588 was applied thereto, through a solvent so as to make up the outer base coat layer 22. In particular, a solution of 17.5% MB-2588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum is on the order of 2.7 optical density. Once the aluminum has been deposited, the top coat structure was then applied. Specifically, a coating of less than or equal to 0.4 pounds per ream (≤0.62 gsm) of Dianal PB-588 was applied to the vapor deposited aluminum layer so as to form the inner top coat layer 30. A solution of 16 formula weight percent PB-588 in ethyl acetate was provided. The coating was applied, and then the solvent was evaporated. Finally, a coating of less than or equal to 0.4 pounds per ream (≤0.62 gsm) of Dianal BR-87 was applied to the inner top coat layer 32. A solution of 17.5 formula weight percent BR-87 in ethyl acetate was provided. The coating was applied, and then the solvent was evaporated to form the outer top layer 32.

To test such a material, a bag such as the bag shown in FIG. 2, was created from the material. A fresh prepared Burger King Hamburger was placed into the bag and placed in a 90° C. oven for 90 minutes. At the conclusion of the 90 minutes, the bag was removed from the oven and observations were made. In particular, pickle juice and peanut oil leaching repression, through both the panel side and gusset folds were noted. In addition, excellent hot sandwich bun release was observed. Additionally, when exposed to steam for 30 minutes the bag material showed no surface defect other than moderate gloss loss due to metal matting.

EXAMPLE 9

The present example has as its base material, a 50 pound per ream (82 gsm) Bladepak SR2 paperboard material having a clay coating on one side thereof. To this material, a coating of less than or equal to 0.5 pound per ream (≤0.82 gsm) of a combination of Joncryl DFC 3040, Joncryl DFC 3050 and Surfynol DF-75 Defoamer, was applied thereto through an aqueous solution so as to make up the inner base coat layer 20. In particular, a solution of 9% by weight DFC 3040 acrylic solids mixed with 9% by weight DFC 3050 acrylic solids and 0.08 formula weight percent Surfynol DF-75 Defoamer. The coating was applied to the underlying base material, and the water was evaporated in a 70° C. oven for 1 minute to both dry and aid in polymer coalescence.

Next a coating of less than or equal to 0.5 pound per ream (≤0.82 gsm) of Dianal MB-2588 was applied thereto through a solvent so as to make up the outer base coat layer 22. In particular, a solution of 17.5 formula weight percent MB-2588 in ethyl acetate is provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 2.7 optical density. Once the aluminum had been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70 C oven for 1 minute so as to form the inner top coat layer 30. Finally, a coating of less than or equal to 0.5 pound per ream of Dianal BR-87 (≤0.82 gsm) is applied to the inner top coat layer 32. In particular, a solution of 17.5 formula weight percent BR-87 in ethyl acetate was provided. The coating was applied, and then the solvent was evaporated by placement in an oven at 70° C. for 1 minute so as to form the outer top layer 32.

The material was tested in a manner similar to the testing with respect to Example 8. Specifically, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 10

The present example has as its base material, a 38 pound per ream (62 gsm) Bladepak SR2 paperboard material having a clay coating on one side thereof. To this material, a coating of less than or equal to 0.4 pounds per ream (≤0.62 gsm) of a combination of Joncryl DFC 3040, Joncryl DFC 3050 and Surfynol DF-75 Defoamer, was applied thereto through an aqueous solution so as to make up the inner base coat layer 20. In particular, a solution of 9% by weight DFC 3040 acrylic solids mixed with 9% by weight DFC 3050 acrylic solids and 0.08 formula weight percent Surfynol DF-75 Defoamer. The coating was applied to the underlying base material, and the water was evaporated in a 70 C oven for 1 minute to both dry and aid in polymer coalescence.

Next a coating of less than or equal to 0.4 pounds per ream (≤0.62 gsm) of Dianal MB-2588 is applied thereto through a solvent so as to make up the outer base coat layer 22. In particular, a solution of 17.5 formula weight percent MB-2588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum is on the order of 2.7 optical density. Once the aluminum had been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70 C oven for 1 minute so as to form the inner top coat layer 30 of less than or equal to 0.4 pounds per ream (≤0.62 gsm). Finally, a coating of less than or equal to 0.4 pounds per ream (≤0.62 gsm) of Dianal BR-87 is applied to the inner top coat layer 32. In particular, a solution of 17.5 formula weight percent BR-87 in ethyl acetate was provided. The coating was applied, and the solvent was evaporated in 70 C oven for 1 minute so as to form the outer top layer 32.

This material was prepared for testing in a manner similar to that undertaken with respect to Example 8. When tested, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 11

The present example has as its base material, a 50 pound per ream (82 gsm) Bladepak SR2 paperboard material having a clay coating on one side thereof. To this material, a coating of less than or equal to 0.5 pound per ream (≤0.82 gsm) of Dianal MB-7017 is applied thereto through a solvent so as to make up the outer base coat layer 22. In particular, a solution of 17.5% MB-7017 in ethyl acetate was provided. The coating was applied to the underlying base material, and the solvent was evaporated (70 C oven for 1 minute).

Next a coating of less than or equal to 0.5 pound per ream (≤0.82 gsm) of Dianal PB-588 is applied thereto through a solvent so as to make up the outer base coat layer 22. In particular, a solution of 19 formula weight percent PB-588 in ethyl acetate is provided. The coating was applied to the inner base coat layer 20, and the solvent was evaporated.

Subsequently, a layer of aluminum was vapor deposited onto the exposed outer base coat layer 22. In this example, the optical density of the aluminum is on the order of 2.7 optical density. Once the aluminum has been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70 C oven for 1 minute so as to form the inner top coat layer 30. Finally, a coating of less than or equal to 0.5 pound per ream of Dianal BR-87 (≤0.82 gsm) is applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

This material was prepared for testing in a manner similar to that undertaken with respect to Example 8. When tested, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 12

The present example has as its base material, a 38 pound per ream (62 gsm) Bladepak SR2 paperboard material having a clay coating on one side thereof. To this material, a coating of less than or equal to 0.4 pounds per ream (≤0.62 gsm) of Dianal MB-7017 is applied thereto through a solvent so as to make up the outer base coat layer 22. In particular, a solution of 17.5 formula weight percent MB-7017 in ethyl acetate was provided. The coating was applied to the underlying base material, and the solvent was evaporated in a 70° C. oven for 1 minute.

Next a coating of less than or equal to 0.4 pounds per ream (≤0.62 gsm) of Dianal PB-588 is applied thereto through a solvent so as to make up the outer base coat layer 22. In particular, a solution of 19% PB-588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum is on the order of 2.7 optical density. Once the aluminum had been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70 C oven for 1 minute so as to form the inner top coat layer 30, of less than or equal to 0.4 pounds per ream (≤0.62 gsm). Finally, a coating of less than or equal to 0.4 pounds per ream (≤0.62 gsm) of Dianal BR-87 is applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

This material was prepared for testing in a manner similar to that undertaken with respect to Example 8. When tested, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 13

The present example has as its base material, a 50 pound per ream (82 gsm) Bladepak SR2 paperboard material having a clay coating on one side thereof. To this material, a coating of less than or equal to 0.5 pound per ream (≤0.82 gsm) of Dianal MB-7017 was applied thereto through a solvent so as to make up the outer base coat layer 22. In particular, a solution of 17.5 formula weight percent MB-7017 in ethyl acetate is provided. The coating was applied to the underlying base material, and the solvent was evaporated in a 70 C oven for 1 minute.

Next a coating of less than or equal to 0.5 pound per ream (≤0.82 gsm) of Dianal PB-588 was applied thereto through a solvent so as to make up the outer base coat layer 22. In particular, a solution of 19 formula weight percent PB-588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 2.7 optical density. Once the aluminum has been deposited, the top coat structure was then applied. Specifically, a coating of less than or equal to 0.5 pound per ream (≤0.82 gsm) of Dianal MB-2588 is applied thereto through a solvent so as to make up the inner top coat layer 30. In particular, a solution of 17.5 formula weight percent MB-2588 in ethyl acetate is provided. The coating was applied and then the solvent was evaporated. Finally, a coating of less than or equal to 0.5 pound per ream of Dianal BR-87 (≤0.82 gsm) is applied to the inner top coat layer 32. In particular, a solution of 17.5 formula weight percent BR-87 in ethyl acetate was provided. The coating was applied, and then the solvent was evaporated in 70° C. oven for 1 minute so as to form the outer top layer 32.

This material was prepared for testing in a manner similar to that undertaken with respect to Example 8. When tested, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 14

The present example has as its base material, a 38 pound per ream (62 gsm) Bladepak SR2 paperboard material having a clay coating on one side thereof. To this material, a coating of less than or equal to 0.4 pounds per ream (≤0.62 gsm) of Dianal MB-7017 is applied thereto through a solvent so as to make up the outer base coat layer 22. In particular, a solution of 17.5 formula weight percent MB-7017 in ethyl acetate was provided. The coating was applied to the underlying base material, and the solvent was evaporated (70 C oven for 1 minute).

Next a coating of less than or equal to a 0.4 pounds per ream (≤0.62 gsm) of Dianal PB-588 was applied thereto through a solvent so as to make up the outer base coat layer 22. In particular, a solution of 19 formula weight percent PB-588 in ethyl acetate was provided. The coating was applied to the inner base coat layer 20, and the solvent was evaporated.

Subsequently, a layer of aluminum was vapor deposited onto the exposed outer base coat layer 22. In this example, the optical density of the aluminum was on the order of 2.7 optical density. Once the aluminum has been deposited, the top coat structure was then applied. Specifically, a coating of less than or equal to 0.4 pounds per ream (≤0.62 gsm) of Dianal MB-2588 was applied thereto through a solvent so as to make up the inner top coat layer 30. In particular, a solution of 17.5 formula weight percent MB-2588 in ethyl acetate is provided. The coating was applied and then the solvent was evaporated. Finally, a coating of less than or equal to 0.4 pounds per ream (≤0.62 gsm) of Dianal BR-87 was applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

This material was prepared for testing in a manner similar to that undertaken with respect to Example 8. When tested, pickle juice and peanut oil leaching repression, through both the panel side and gusset folds were noted. In addition, excellent hot sandwich bun release was observed. Further, exposure to steam for 30 minutes showed no surface defect other than moderate gloss loss due to metal matting.

EXAMPLE 15

The present example has as its base material, a 50 pound per ream (82 gsm) Bladepak SR2 paperboard material having a clay coating on one side thereof. To this material, a coating of less than a half a pound per ream (<0.82 gsm) of Dianal PB-588 was applied thereto through a solvent so as to make up the outer base coat layer 22. In particular, a solution of 19% PB-588 in ethyl acetate was provided. The coating is applied to the inner base coat layer 20, and the solvent was evaporated in a 70° C. oven for 1 minute.

Subsequently, a layer of aluminum was vapor deposited onto the exposed outer base coat layer 22. In this example, the optical density of the aluminum was on the order of 2.7 optical density. Once the aluminum has been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water is evaporated in a 70° C. oven for 1 minute so as to form the inner top coat layer 30 of weight less than 0.64 gsm (<0.4 lbs/rm). Finally, a coating of less than a half a pound per ream of Dianal BR-87 (<0.82 gsm) was applied to the inner top coat layer 32. In particular, a solution of 17.5 formula weight percent BR-87 in ethyl acetate is provided. The coating was applied, and then the solvent was evaporated (70 C oven for 1 minute so as to form the outer top layer 32).

EXAMPLE 16

The present example has as its base material, a 38 pound per ream (62 gsm) Bladepak SR2 paperboard material having a clay coating on one side thereof. To this material, a coating of less than 0.4 pounds per ream (<0.64 gsm) of Dianal PB-588 is applied thereto through a solvent so as to make up the outer base coat layer 22. In particular, a solution of 17.5% PB-588 in ethyl acetate was provided. The coating was applied to the inner base coat layer 20, and the solvent was evaporated in a 70° C. oven for 1 minute.

Subsequently, a layer of aluminum was vapor deposited onto the exposed outer base coat layer 22. In this example, the optical density of the aluminum was on the order of 2.7 optical density. Once the aluminum had been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70° C. oven for 1 minute so as to form the inner top coat layer 30 of weight less than 0.64 gsm. Finally, a coating of less than 0.4 pounds per ream of Dianal BR-87 (<0.64 gsm) was applied to the inner top coat layer 32. In particular, a solution of 17.5 formula weight percent BR-87 in ethyl acetate was provided. The coating was applied, and then the solvent was evaporated (70 C oven for 1 minute so as to form the outer top layer 32).

EXAMPLE 17

The present example has as its base material, a 50 pound per ream (82 gsm) Bladepak SR2 paperboard material having a clay coating on one side thereof. To this material, a coating of less than a half a pound per ream (<0.82 gsm) of Dianal PB-588 was applied thereto through a solvent so as to make up the outer base coat layer 22. In particular, a solution of 19% PB-588 in ethyl acetate was provided. The coating was applied to the inner base coat layer 20, and the solvent was evaporated in a 70° C. oven for 1 minute.

Subsequently, a layer of aluminum was vapor deposited onto the exposed outer base coat layer 22. In this example, the optical density of the aluminum was on the order of 2.7 optical density. Once the aluminum has been deposited, the top coat structure was then applied. Specifically, a coating of less than a half pound per ream (<0.82 gsm) of Dianal MB-2588 was applied thereto through a solvent so as to make up the inner top coat layer 30. In particular, a solution of 17.5% MB-2588 in ethyl acetate was provided. The coating was applied and then the solvent evaporated. Finally, a coating of less than a half a pound per ream of Dianal BR-87 (<0.82 gsm) was applied to the inner top coat layer 32. In particular, a solution of 17.5 formula weight percent BR-87 in ethyl acetate was provided. The coating was applied, and then the solvent was evaporated (70 C oven for 1 minute so as to form the outer top layer 32).

EXAMPLE 18

The present example has as its base material, a 38 pound per ream (62 gsm) Bladepak SR2 paperboard material having a clay coating on one side thereof. To this material, a coating of less than 0.4 pounds per ream (<0.64 gsm) of Dianal PB-588 was applied thereto through a solvent so as to make up the outer base coat layer 22. In particular, a solution of 17.5% PB-588 in ethyl acetate was provided. The coating was applied to the inner base coat layer 20, and the solvent was evaporated in a 70° C. oven for 1 minute.

Subsequently, a layer of aluminum was vapor deposited onto the exposed outer base coat layer 22. In this example, the optical density of the aluminum was on the order of 2.7 optical density. Once the aluminum has been deposited, the top coat structure was then applied. Specifically, a coating of less than 0.4 pounds per ream (<0.62 gsm) of Dianal MB-2588 was applied thereto through a solvent so as to make up the inner top coat layer 30. In particular, a solution of 17.5% MB-2588 in ethyl acetate was provided. The coating was applied and then the solvent was evaporated. Finally, a coating of less than 0.4 pounds per ream (<0.62 gsm) of Dianal BR-87 was applied to the inner top coat layer 32. In particular, a solution of 17.5 formula weight percent BR-87 in ethyl acetate was provided. The coating was applied, and then the solvent was evaporated (70 C oven for 1 minute so as to form the outer top layer 32).

EXAMPLE 19

The present example has as its base material, a 50 pound per ream (82 gsm) Bladepak SR2 paperboard material having a clay coating on one side thereof. To this material, a coating of a water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70° C. oven for 1 minute so as to form the inner top coat layer 30 of weight less than 0.82 gsm (<0.5 lbs/rm). Finally, a coating of less than a half a pound per ream of Dianal BR-87 (<0.82 gsm) was applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

EXAMPLE 20

The present example has as its base material, a 38 pound per ream (62 gsm) Bladepak SR2 paperboard material having a clay coating on one side thereof. To this material, a coating of a water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70° C. oven for 1 minute so as to form the inner top coat layer 30 of weight less than 0.62 gsm (<0.4 lbs/rm). Finally, a coating of less than 0.4 pound per ream of Dianal BR-87 (<0.62 gsm) was applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

EXAMPLE 21

The present example has as its base material, a 50 pound per ream (82 gsm) Bladepak SR2 paperboard material having a clay coating on one side thereof. To this material, a coating of less than a half pound per ream (<0.82 gsm) of Dianal MB-2588 was applied thereto through a solvent so as to make up the inner top coat layer 30. In particular, a solution of 17.5% MB-2588 in ethyl acetate was provided. The coating was applied and then the solvent was evaporated. Finally, a coating of less than a half a pound per ream of Dianal BR-87 (<0.82 gsm) was applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

EXAMPLE 22

The present example has as its base material, a 38 pound per ream (62 gsm) Bladepak SR2 paperboard material having a clay coating on one side thereof. To this material, a coating of less than 0.4 pounds per ream (<0.62 gsm) of Dianal MB-2588 was applied thereto through a solvent so as to make up the inner top coat layer 30. In particular, a solution of 17.5% MB-2588 in ethyl acetate was provided. The coating was applied and then the solvent was evaporated. Finally, a coating of less than a half a pound per ream of Dianal BR-87 (<0.62 gsm) was applied to the inner top coat layer 32. In particular, a solution of 17.5 formula weight percent BR-87 in ethyl acetate was provided. The coating was applied, and then the solvent was evaporated in a 70° C. oven for 1 minute so as to form the outer top layer 32.

EXAMPLE 23

The present example has as its base material, a fifty pound Bladepak SR2 paperboard material having a clay coating on one side thereof. To this material, a coating of water let down (dilution from 42% solids down to 18% solids) Cork PC-94 FDA was provided The coating was applied, and then the water was evaporated in a 70° C. oven for 1 minute so as to form the inner base coat layer 20 of less than a half a pound per ream. Next, a dried coating of less than a half pound per ream of a combination of Joncryl DFC 3040, Joncryl DFC 3050 and DF-75, was applied thereto through an aqueous solution so as to make up the outer base coat layer 22. In particular, a solution of 9% by weight DFC 3040, 9% by weight DFC 3050 and 0.08% by weight the Surfynol DF-75 Defoamer anti-foaming agent. The coating was applied to the underlying inner base coat and the water was evaporated at 70° C. for 1 minute.

Subsequently, a layer of aluminum was vapor deposited onto the exposed outer base coat layer 22. In this example, the optical density of the aluminum was on the order of 2.7. Once the aluminum has been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70 C oven for 1 minute so as to form the inner top coat layer 30 of less than a half a pound per ream. Finally, a coating of less than a half a pound per ream of Dianal BR-87 (<0.82 gsm) was applied to the inner top coat layer 32. In particular, a solution of 17.5 formula weight percent BR-87 in ethyl acetate was provided. The coating was applied, and then the solvent was evaporated (70 C minute for 1 minute so as to form the outer top layer 32).

EXAMPLE 24

The present example has as its base material, a thirty eight pound Bladepak SR2 paperboard material having a clay coating on one side thereof. To this material, a coating of water let down (dilution from 42% solids down to 18% solids) Cork PC-94 FDA was provided The coating was applied, and then the water was evaporated in a 70° C. oven for 1 minute so as to form the inner base coat layer 20 of less than 0.4 pounds per ream. Next, a dried coating of less than 0.4 pounds per ream of a combination of Joncryl DFC 3040, Joncryl DFC 3050 and DF-75, was applied thereto through an aqueous solution so as to make up the outer base coat layer 22. In particular, a solution of 9% by weight DFC 3040, 9% by weight DFC 3050 and 0.08% by weight the Surfynol DF-75 Defoamer anti-foaming agent. The coating was applied to the underlying inner base coat and the water was evaporated at 70° C. for 1 minute.

Subsequently, a layer of aluminum was vapor deposited onto the exposed outer base coat layer 22. In this example, the optical density of the aluminum was on the order of 2.7. Once the aluminum has been deposited, the top coat structure was then applied. Specifically, a coating of water let down (dilution from 48.3% solids to 18% solids) Michelman Michem Coat 82 was provided, with the incorporation of 0.3 formula weight percent Surfynol DF-75 Defoamer. The coating was applied, and then the water was evaporated in a 70° C. oven for 1 minute so as to form the inner top coat layer 30. Finally, a coating of less than a half a pound per ream of Dianal BR-87 (<0.82 gsm) was applied to the inner top coat layer 32. In particular, a solution of 17.5 formula weight percent BR-87 in ethyl acetate was provided. The coating was applied, and then the solvent was evaporated (70° C. oven for 1 minute so as to form the outer top layer 32).

A summary chart of the different formulations of the exemplary embodiments is disclosed below:

What is claimed is:

1. A film for use in association with packaging useable with foodstuffs having product contact comprising:
    a first outer base material comprising a dimensionally stable cellulosic material having a top surface and a bottom surface, the base material having a base material weight per unit area;
    a base coat structure having at least one base layer extending over substantially the entirety of the top surface of the base material, each of the at least one base layer comprising a base layer weight per unit area, the at least one base layer weight per unit area of each of the at least one base layer is less than or equal to 1% of the base material weight per unit area, the at least one base layer comprising a polymer coating;
    a metallized layer applied directly to an outer one of the at least one base layer in an optical density of between 1.5 and 4.5 optical density;
    a top coat structure having an inner top layer applied directly to the metallized layer and a second outer top layer applied over the inner top layer, the inner top layer and the outer top layer comprising polymer coatings which are chemically distinct from each other and from each of the at least one base layer of the base coat, the inner top layer having an inner top layer weight per unit area, the inner top layer weight per unit area is less than or equal to 1% of the base material weight per unit area, the inner top layer having a glass transition temperature that is less than 100° C. and a molecular weight that is greater or equal to 25,000 grams per mole (MW), and the outer top layer having a glass transition temperature that is greater than 100° C.

| Example No. | Base Material Weight Per Ream (lbs) | Inner Base Coat Resin | Outer Base Coat Resin | Metallized Layer Optical Density | Inner Top Coat Resin | Outer Top Coat Resin |
|---|---|---|---|---|---|---|
| 1 | 35 | MB-7017 | MB-7017 | 3.2 | MB-7017 | NA |
| 2 | 50 | MB-2588 | MB-7017 | 3.2 | BR-57 | NA |
| 3 | 50 | DFC3040/3050 | MB7017 | 3.2 | BR-57 | MB-2588 |
| 4 | 50 | DFC3040/3050 | MB-2588 | 3.2 | PC-94 FDA | CK 74-120 |
| 5 | 38 | DFC3040/3050 | MB-2588 | 3.2 | PC-94 FDA | CK 74-120 |
| 6 | 35 | DFC3040/3050 | MB-2588 | 3.2 | C C-94 FDA | CK 74-120 |
| 7 | 50 | DFC3040/3050 | MB-2588 | 2.7 | BR-588 | BR-87 |
| 8 | 38 | DFC3040/3050 | MB-2588 | 2.7 | PB-588 | BR-87 |
| 9 | 50 | DFC3040/3050 | MB-2588 | 2.7 | M Coat 82 | BR-87 |
| 10 | 38 | DFC3040/3050 | MB-2588 | 2.7 | M Coat 82 | BR-87 |
| 11 | 50 | MB-7017 | PB-588 | 2.7 | M Coat 82 | BR-87 |
| 12 | 38 | MB-7017 | PB-588 | 2.7 | M Coat 82 | BR-87 |
| 13 | 50 | MB-7017 | PB-588 | 2.7 | MB-2588 | BR-87 |
| 14 | 38 | MB-7017 | PB-588 | 2.7 | MB-2588 | BR-87 |
| 15 | 50 | PB-588 | NA | 2.7 | M Coat 82 | BR-87 |
| 16 | 38 | PB-588 | NA | 2.7 | M Coat 82 | BR-87 |
| 17 | 50 | PB-588 | NA | 2.7 | MB-2588 | BR-87 |
| 18 | 38 | PB-588 | NA | 2.7 | MB-2588 | BR-87 |
| 19 | 50 | M Coat 82 | BR-87 | NA | NA | NA |
| 20 | 38 | M Coat 82 | BR-87 | NA | NA | NA |
| 21 | 50 | MB-2588 | BR-87 | NA | NA | NA |
| 22 | 38 | MB-2588 | BR-87 | NA | NA | NA |
| 23 | 50 | PC-94 FDA | DFC 3040/3050 | 2.7 | M Coat 82 | BR-87 |
| 24 | 38 | PC-94 FDA | DFC 3040/3050 | 2.7 | M Coat 82 | BR-87 |

The foregoing description merely explains and illustrates the invention and the invention is not limited thereto except insofar as the appended claims are so limited, as those skilled in the art who have the disclosure before them will be able to make modifications without departing from the scope of the invention.

2. The film of claim 1 wherein the at least one base layer comprises an inner base layer applied over the base material and an outer base layer applied over the inner base layer, the inner base layer having an inner base layer weight per unit area, the at least one inner base layer weight per unit area is less than 1% of the base material weight per unit area, the outer base layer having an outer base layer weight per unit area, the at least one outer base layer weight per unit area is less than 1% of the base material weight per unit area.

3. The film of claim 2 wherein the outer base layer is applied directly over the inner base layer, and extends over substantially the entirety of the inner base layer.

4. The film of claim 1 wherein the top coat structure further includes at least one intermediate top layer positioned between the inner top layer and the outer top layer, each of the at least one intermediate top layers having an intermediate top layer weight per unit area, with the intermediate top layer weight per unit area less than or equal to 1% of the base material weight per unit area.

5. The film of claim 4 wherein a sum of each one of the at least one base layer weight per unit area, the inner top layer weight per unit area, the outer top layer weight per unit area, and each of the at least one intermediate top layer weight per unit area is less than or equal to 5% of the base material weight per unit area.

6. The film of claim 1 wherein the sum of each one of the at least one base layer weight per unit area, the inner top layer weight per unit area and the outer top layer weight per unit area is less than or equal to 5% of the base material weight per unit area.

7. The film of claim 2 wherein the inner base layer further comprises a combination of an acrylic copolymer coating having a molecular weight of approximately 40,000 grams per mole and a styrene acrylic copolymer coating a molecular weight of approximately 40,000 grams per mole.

8. The film of claim 7 wherein the outer base layer further comprises a n-Butyl Methacrylate acrylic copolymer coating having a molecular weight of approximately 90,000 grams per mole.

9. The film of 8 wherein the inner top layer comprises a high acid acrylic copolymer coating, and the outer top layer comprises a Methyl Methacrylate acrylic copolymer coating.

10. The film of claim 9 wherein the base material weight per unit area comprises between 35 pounds per ream and 50 pounds per ream.

11. The film of claim 2 wherein the inner base layer further comprises a n-Butyl Methacrylate acrylic copolymer coating.

12. The film of claim 11 wherein the outer base layer further comprises an acrylic copolymer having high molecular weight of approximately 90,000 grams per mole.

13. The film of claim 12 wherein the inner top layer comprises a n-Butyl Methacrylate acrylic copolymer coating and the outer top layer comprises a Methyl Methacrylate acrylic copolymer coating.

14. The film of claim 13 wherein the base material weight per unit area comprises between 35 pounds per ream and 50 pounds per ream.

15. The film of claim 2 wherein the inner base layer comprises one of a n-Butyl Methacrylate acrylic copolymer coating, and a combined modified acrylic copolymer and modified styrene acrylic copolymer coating.

16. The film of claim 15 wherein the outer base layer comprises at least one of a n-Butyl Methacrylate acrylic copolymer coating, and a high acid acrylic coating, each having a molecular weight of approximately 90,000 grams per mole.

17. The film of claim 16 wherein the inner top layer comprises one of a styreneated acrylic copolymer coating, a n-Butyl Methacrylate acrylic copolymer coating, an acrylic emulsion polymer coating, an acrylic copolymer coating with an acid value of approximately 50 milligrams potassium hydroxide per gram of polymer having as molecular weight of approximately 90,000 grams per mole, a water-based acrylic emulsion coating, with the outer top layer comprising one of a n-Butyl Methacrylate acrylic copolymer coating, an acrylic emulsion polymer coating and a Methyl Methacrylate acrylic copolymer coating.

18. A gusseted open top bag formed from the film of claim 1.

* * * * *